July 7, 1959 — H. S. BLOCH ET AL — 2,894,046
MANUFACTURE OF PARA-XYLENE
Filed April 12, 1957
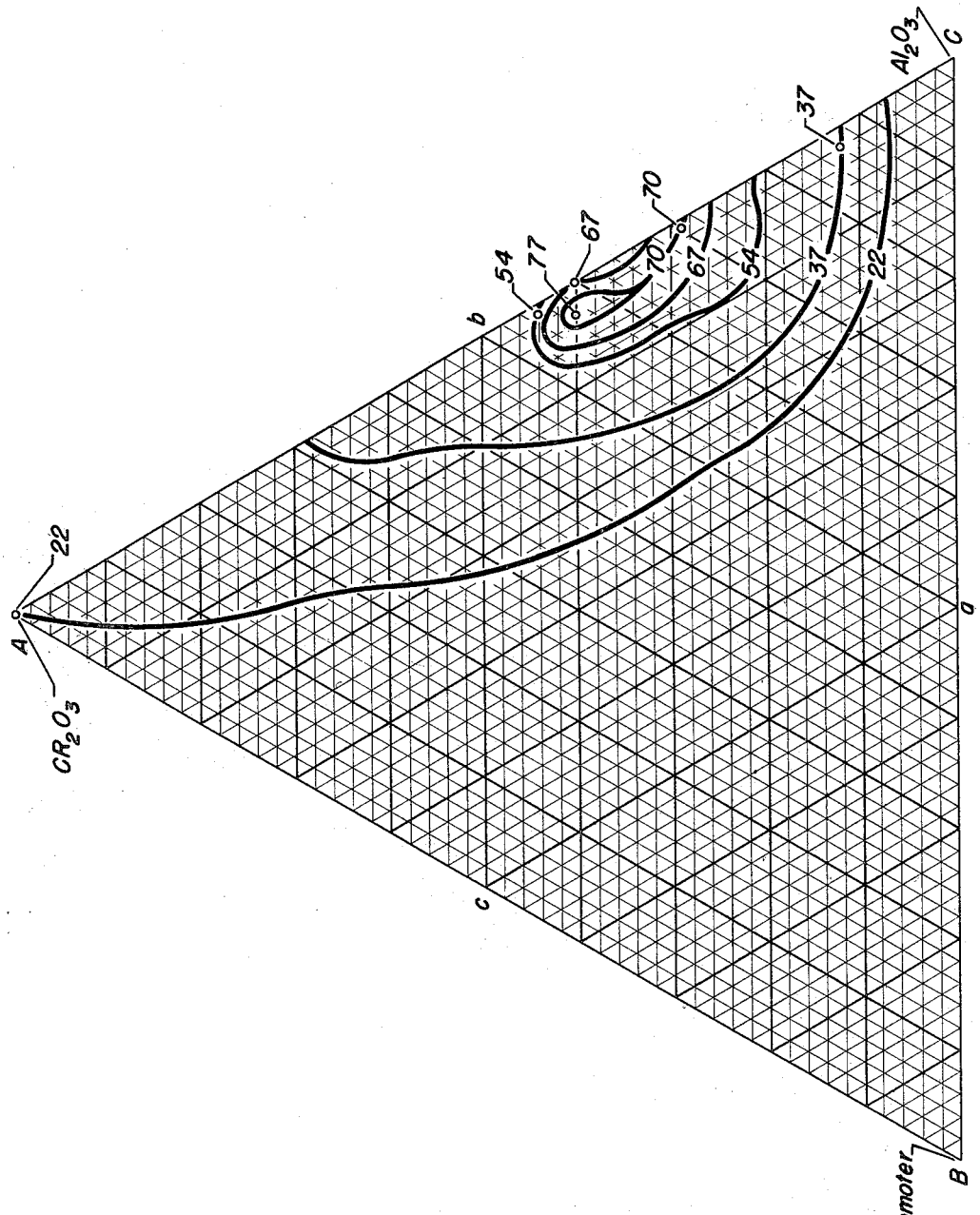
INVENTORS:
Herman S. Bloch
Edward M. Geiser
BY: Chester J. Giuliani
Philip J. Liggett
ATTORNEYS

United States Patent Office 2,894,046
Patented July 7, 1959

2,894,046

MANUFACTURE OF PARA-XYLENE

Herman S. Bloch, Skokie, and Edward M. Geiser, Downers Grove, Ill., assignors, by mesne assignments, to Universal Oil Products Company, Des Plaines, Ill., a corporation of Delaware Application April 12, 1957, Serial No. 652,545

16 Claims. (Cl. 260—673.5)

The present invention is a continuation-in-part of our co-pending application, Serial Number 498,106, filed March 30, 1955, and now abandoned.

This invention relates to the dehydrocyclization of branched-chain hydrocarbons, and is specifically directed toward a process for the manufacture of para-xylene from 2-ethylhexene.

It is an object of our invention to produce a particular product from a specific charging material while employing certain definite types of catalysts having a dehydrocylization action on hydrocarbons. It is a particular object of our invention to produce para-xylene from 2-ethylhexene.

Para-xylene finds widespread use, particularly in the petroleum industry. It is well known that para-xylene, when added to an aviation fuel blend, increases its rich mixture-response rating; that is, its performance rating when employing high fuel-to-air ratios, for example during take off, or any other instant during which maximum power is desired from the engine. Therefore, our invention is of particular importance at the present time in view of the great demand for aviation fuel. Para-xylene is also very much in demand for use as a starting material in the oxidation process for the manufacture of terephthalic acid.

In one embodiment, the present invention relates to a process for producing para-xylene which comprises subjecting 2-ethylhexene at dehydrocyclization conditions to the action of a catalyst comprising an inorganic refractory oxide carrier material, from about 26% to about 43% by weight of a chromium component, from about 0.01% to about 5% by weight of an alkaline earth metal component and from about 1% to about 6% by weight of a potassium component.

In another embodiment, the present invention provides a process for producing para-xylene which comprises subjecting 2-ethylhexene at dehydrocyclization conditions to the action of a catalyst comprising an inorganic refractory oxide carrier material, from about 1% to about 6% by weight of a potassium component and from about 26% to about 43% by weight of a chromium component.

In a specific embodiment, our invention relates to a process for producing para-xylene which comprises subjecting 2-ethylhexene at a temperature of from about 400° C. to about 750° C., a total absolute pressure of from about 10 to about 1000 millimeters of mercury and a liquid hourly space velocity of from about 0.01 to about 10, to the action of a catalyst comprising alumina, from about 26% to about 43% by weight of chromia, from about 0.01% to about 5% by weight of an alkaline earth metal component and from about 1% to about 6% by weight of a potassium component.

Broadly speaking, our invention relates to a process for the manufacture of xylenes, particularly para-xylene from 2-ethylhexene through the utilization of a particular catalyst. The catalyst employed in the process of our invention contains three or four components. The catalyst, when of three components, including the refractory oxide support, contains an inorganic refractory metal oxide, a chromium component which may be a chromium oxide or some other compound of chromium, and a potassium component which may be potassium oxide, potassium hydroxide, or another compound of potassium having a non-metallic anion, unless the anion contains a metal which comprises another component of the catalyst, such as chromium of aluminum; when of four components, the catalyst contains an inorganic refractory metal oxide, a chromium component, a potassium component, and an alkaline earth metal component which may be an alkaline earth oxide, an alkaline earth hydroxide, an alkaline earth chromate, carbonate, formate, oxalate, or other alkaline earth compounds which, upon thermal decomposition, yield an alkaline earth oxide. The three and four component catalysts are not necessarily equivalent, although each will produce a yield of para-xylene, from 2-ethylhexene, which has been heretofore not obtained. Of these catalysts, the four-component catalyst is particularly preferred for utilization in the process of the present invention.

The inorganic refractory metal oxide is a carrier material for the other components of the catalyst, and may have some catalytic activity within itself. Alumina is the preferred refractory inorganic oxide, since it is readily obtainable in a state of relatively high purity, and enhances the propensity of the catalyst to promote the desired reaction, and further, its use generally yields the best results. Other refractory oxide carrier materials which may be employed include silica, zinc oxide, magnesia, titania, zirconia, boron oxide, thoria, etc. Carrier materials comprising two or more refractory inorganic oxide components may be used, such as silica-alumina, silica-magnesia, silica-zirconia, silica-thoria, silica-zinc oxide, silica-alumina-magnesia, silica-alumina-zirconia, silica-alumina-thoria, silica-alumina-zinc oxide, alumina-boron oxide, alumina-zirconia, alumina-thoria, etc. The use of these and other inorganic refractory oxide carrier materials, however, does not necessarily produce equivalent results. Alumina, when employed, is preferred to be utilized in an amount of from about 53% to about 74% by weight of the total final catalyst.

The second component of the catalyst is a chromium component, and is composited with the refractory oxide as a chromium compound, and generally as chromium oxide or chromia ($Cr_2O_3$), with some hexavalent chromium oxide ($CrO_3$). It is believed that the chromium is present as a compound which is associated with one or more of the other components of the catalyst.

The third component of the catalyst is potassium, and will likewise be in the form of a compound of potassium, preferably with a non-metallic anion, such as potassium oxide, potassium carbonate, and potassium hydroxide, or a compound decomposable to one of these (such as the oxalate, nitrate or formate, etc.) unless the anion contains a metal which comprises another component of the catalyst such as chromium or aluminum. It has been found that the presence of potassium serves to render the catalyst of our invention more specific for the particular conversion reaction desired. It is believed that the potassium is present as a compound which is associated with one or more of the other components of the catalyst, either chemically or physically or both, for example, it may be associated with the alumina as $KAlO_2$, or with hexavalent chromium trioxide as $K_2O \cdot CrO_3$ or $K_2CrO_4$, as it is more commonly written. However, it is not intended that the present invention be limited unduly to this theory.

The fourth component of the catalyst is an alkaline earth metal component. It has been found that the presence of an alkaline earth metal component enhances the property of the catalyst which is desired for the conversion of 2-ethylhexene to xylenes; further, it has been found that the presence of an alkaline earth metal component serves to reduce the amount of carbon deposited onto the catalyst during the conversion operation. The component usually exists as an oxide, hydroxide, or other compound, preferably with a nonmetallic anion which is decomposable to the oxide, such as the carbonate, oxalate, formate, acetate, nitrate, etc., unless the anion contains a metal which comprises another component of the catalyst, such as chromium or aluminum. Of the alkaline earth metal compounds, the oxides of magnesium and calcium are preferred, although oxides and hydroxides of strontium and barium may be utilized in some instances. The alkaline earth metals are not equivalent, and different metals may be used with different catalysts. Magnesium is referred to herein as one of the alkaline earth metals, in accordance with its common listing in periodic table arrangements in the left hand column of group II (sometimes called group II–A) along with the alkaline earth metals. (For example, see "The Handbook of Chemistry," pages 54–55, by N. A. Lange, fifth edition, 1944, Handbook Publishers, Inc., Sandusky, Ohio.)

The catalyst of the present invention may be prepared in any suitable manner. For example, an aqueous solution may be made of aluminum chloride and chromium nitrate, and a suitable basic precipitant, preferably comprising ammonia or ammonium hydroxide, is added thereto in a sufficient amount to co-precipitate aluminum and chromium. The pH of the resulting solution usually will be within the range of from 7 to 10. After co-precipitation of aluminum and chromium, the precipitate may be thoroughly washed with water to remove soluble compounds comprising ammonium chloride and ammonium nitrate. After separation of the washing medium, the wet filter cake may be dried, but preferably it is then composited with a suitable alkaline earth metal compound in proportions to form a final catalyst containing from about 0.01% to about 5% by weight of the alkaline earth metal component. A particularly suitable alkaline earth metal compound comprises the nitrate, and preferably its readily available hydrated form designated as $X(NO_3)_2 \cdot 4H_2O$, where X designates the alkaline earth metal. A conventional method of admixing the nitrate with the filter cake is to dissolve the nitrate in water and then form a slurry with the filter cake. Potassium is then added, for example as potassium chromate ($K_2CrO_4$), potassium oxide or potassium hydroxide, in proportions to form a final catalyst containing about 1% to about 6% by weight of potassium. The composite may then be dried at relatively low temperatures.

After the composited catalyst has been treated as aforesaid, to leave a dry powder, the powder may be ground, a suitable lubricant added (such as, for example, Sterotex) and the mixture then pelleted to form pills of desired size and shape. The pills are then calcined at the desired temperature, which generally is from about 500° C. to about 750° C., to remove the lubricant prior to the use of the catalyst in the reaction.

Not all the catalysts possible from the above mentioned elements have the same ore equivalent catalytic value in promoting and accelerating the reaction involved in our invention, and when different elements are used on different carrier materials, optimum conditions for the formation of maximum yields of the desired compound will vary; however, generally the operating conditions will fall within the ranges hereinafter specified.

As hereinbefore mentioned, the catalyst of this invention is particularly adaptable to the formation of xylenes, and particularly para-xylene, from 2-ethylhexene. The process may be of the fixed-bed type in which the catalyst is disposed within tubes or chambers and the hydrocarbons are passed therethrough. Such operations may also include the use of a heat exchange medium in the zone surrounding the catalyst-containing tube or chamber. Other operations include the fluidized type in which the catalyst and reactants are introduced into a reaction zone under hindered settling conditions. Slurry type operations in which the hydrocarbons and catalyst are mixed to form a slurry and then introduced into the reactor at the desired temperature to effect dehydrocyclization are also contemplated by the present invention, as well as the moving bed type of operation in which the catalyst and hydrocarbons are passed concurrently or countercurrently through a reaction zone maintained at the desired temperature conditions.

Briefly, the preferred catalyst of the present invention is a catalyst containing four components, an inorganic refractory metal oxide, a chromium component, a potassium component, and an alkaline earth metal component. The chromium component concentration will usually be within the range of from about 26% to about 43% by weight of the catalyst. The concentration of chromium component is calculated as the weight percent of the equivalent oxide of trivalent chromium ($Cr_2O_3$), even where all of the chromium is present as some other compound. It is essential to the process of the present invention, whether employing the three, or four component catalyst, that the concentration of the chromium component lie within the range hereinabove stated.

The concentration of the potassium component is from about 0.01% to about 6% by weight of the catalyst when as integral component of a three-component catalyst; when an integral component of a four-component catalyst, the preferred range is from about 1% to about 6% by weight, and is calculated as the weight percent of the equivalent potassium hydroxide in the catalyst even though all of the potassium is present as some other compound. The concentration of the alkaline earth metal component is from about 0.01% to about 5% by weight of the final catalyst and is calculated as the weight percent of the equivalent oxide of the element, even though the component may exist in some other chemical combination in the composite.

The preferred range of conditions at which our process may be conducted are: temperatures within the range of from about 400° C. to about 750° C. and preferably within the range of from about 450° C. to about 650° C. Subatmospheric pressures or superatmospheric pressures may be used, with a preferred absolute total pressure range of from about 10 to 1000 millimeters of mercury. The reaction is preferably conducted in the presence of hydrogen, which reduces markedly the deposition of carbon onto the catalyst, and the hydrogen partial pressure in the reaction zone usually is within the range of from about 5 to about 950 millimeters of mercury; however, higher hydrogen partial pressures may be used. The liquid hourly space velocity employed will usually fall within the range of from about 0.01 to about 10. The term liquid hourly space velocity, as herein employed, is defined as the units of liquid volume of charging material, measured at standard conditions, which are passed per hour through the reaction zone per unit volume of catalyst space.

The following example is introduced to further illustrate the novelty and utility of the present invention, but is not introduced to unduly limit the scope of the invention to the conditions and/or reagents employed therein.

EXAMPLE 2-ethylhexene-1 was passed, at various liquid hourly space velocities, over several catalysts maintained at 500° C. The catalyst compositions and other process conditions are shown in the following table:

Table

| Run Number | 1 | 2 | 3 | 4 | 5 | 6 |
|---|---|---|---|---|---|---|
| Catalyst Composition, Wt. Percent: | | | | | | |
| Al₂O₃ | 86.0 | 57.0 | 59.8 | 0 | 55 | 70 |
| Cr₂O₃ | 12.0 | 40.0 | 40.2 | 100 | 44 | 29 |
| K₂O | 0 | 1.0 | 0 | 0 | 1.0 | 1.0 |
| MgO | 2.0 | 0 | 0 | 0 | 0 | 0 |
| CaO | 0 | 2.0 | 0 | 0 | 0 | 0 |
| Operating Conditions: | | | | | | |
| Temperatures, °C | 500 | 500 | 500 | 500 | 550 | 550 |
| Space Velocity | 0.25 | 0.35 | 0.35 | 0.35 | 0.30 | 0.32 |
| Partial Pressure— | | | | | | |
| H₂, mm. Hg | 673 | 685 | 685 | 685 | 673 | 660 |
| Hydrocarbon, mm. Hg | 87 | 75 | 75 | 75 | 87 | 95 |
| Yields, Wt. Percent: | | | | | | |
| Conversion | 65.8 | 65.6 | 46.0 | 41.0 | 54.6 | 65.8 |
| Xylenes [1], once through | 24.3 | 50.6 | 30.9 | 9.1 | 29.5 | 39.0 |
| Xylenes, Ultimate | 37 | 77 | 67 | 22 | 54 | 70 |
| p-Xylene, Ultimate | 15.5 | 33.3 | 29 | 10 | 23 | 30 |

[1] Including ethylbenzene.

The apparatus used for the experiment consisted of an aluminum-bronze vertical block furnace containing a ¾-inch I.D. stainless steel catalyst tube, thirty-six inches in length. The tube was charged (starting at the bottom) with spacers totaling 10 inches in length at the bottom of the tube to hold the charge in place, fifteen cc. of quartz chips, one hundred cc. of catalyst, ninety cc. of quartz chips as a covering on the catalyst and feed preheater, and a five inch spacer. This arrangement was designed to afford adequate preheating and to position the catalyst bed in a constant-temperature zone of the furnace. Various catalyst compositions were tested as may be noted by referring to the above table.

2-ethylhexene-1 was passed downflow over the catalyst at the conditions designated in the table. The reaction product was passed from the catalyst tube through a stainless steel, water cooled condensing coil into a two liter, round bottom flask immersed in a wet ice bath. The more volatile product passed from the flask through a water-cooled bubble condenser into a Dry Ice-acetone trap and then through a second Dry Ice-acetone trap. The non-condensable gases passed through a drying tower and then through either a gas bottle or a wet test meter and finally exited to the atmosphere.

The liquid product as collected was fractionally distilled into four fractions, a 46° to 100° C. fraction, a 100° to 125° C. fraction, a 125° to 150° C. fraction, and a fraction boiling above 150° C. The 125° to 150° C. fraction was analyzed by an infra-red spectrometer to determine the concentration of ethylbenzene and of each of the xylenes, and the yield of xylenes was calculated for the once-through operation. The last two lines of the table indicate the yield of all the xylenes, and the yield of para-xylene which ultimately could be obtained by employing recycle of the unconverted octenes. It may be seen from the table that the four-component catalyst (run Number 2), especially preferred for our invention, produced the highest yields.

The data obtained, and which is tabulated above, can be readily interpreted by reference to the accompanying drawing. Points A, B and C represent catalysts having compositions of 100% by weight of chromia, 100% by weight of promoter, and 100% by weight of alumina respectively. The word promoter is employed herein to denote either the concentration of the potassium component alone, or the sum of the concentrations of the potassium component and the alkaline earth metal component. The compositions of the different catalysts tested are indicated on the triangular plot as points 37, 77, 67, 22, 54 and 70, being the ultimate yield of xylenes, weight percent, achieved through the use of each particular catalyst. Through each of these points is drawn a constant-yield line which indicates catalyst compositions which would yield a particular quantity of total xylenes.

It is seen that line 67, drawn through point 67, intersects line $b$ in two places, and is tangent to line $b$ at point 67. Line $b$ represents a two-component catalyst containing alumina and chromia, and point 67 represents the specific two-component catalyst of run No. 3. The two intersections indicate two-component catalysts comprising 74% by weight of alumina and 26% by weight of chromia; 68% by weight of alumina, and 32% by weight of chromia.

The addition of a third component, potassium, in an amount of from about 0.01% to about 6% by weight of the total catalyst, is sufficient to increase the ultimate yield of xylenes in excess of 67% by weight of the 2-ethylhexene charge. In order to insure a greater yield than 67%, it is preferred that the potassium component be present in a concentration within the range of from about 1% to about 6% by weight. Three-component catalysts, of which run No. 6 is representative, and illustrated by point 70, are shown on the drawing to produce ultimate yields of total xylenes in excess of 67%, and will produce yields as high as 70% and greater.

As indicated by run Nos. 1 and 5, which produced 37% and 54% by weight of total xylenes respectively, the addition of a third component to the catalyst, whether a potassium component or an alkaline earth metal component, is not always sufficient for producing an increase in the ultimate yield of total xylenes, and particularly para-xylene. The addition of magnesium oxide, without the presence of the potassium component, run No. 1, or the addition of the potassium component alone, run No. 5, serves to decrease the ultimate yield of total xylenes. It is shown to be necessary to combine chromia, alumina, and the potassium component in particular concentrations in order to insure an ultimate yield of total xylenes in excess of 67% by weight, when employing a three-component catalyst.

As hereinbefore set forth, and as illustrated by run No. 2, the particularly preferred catalyst of our invention is a four-component catalyst which comprises from about 53% to about 74% by weight of alumina, from about 26% to about 43% by weight of chromia, from about 1% to about 6% by weight of a potassium component and from about 0.01% to about 5% by weight of an alkaline earth metal component. It is further preferred that the sum of the concentrations of the potassium and alkaline earth metal components lie within the range of from about 1.01% to about 6% by weight. Catalysts, of which run No. 2 is representative, are shown to produce ultimate yields of total xylenes in excess of 67% by weight, and are capable of producing yields as high as about 77% by weight.

As hereinbefore stated, the potassium and the alkaline earth metal components serve particular functions other than contributing to the propensity of the catalyst to produce high yields of xylenes, and especially para-xylene. Therefore, it is essential to the preferred process of the present invention that each of these components be present in the catalyst in concentrations hereinabove stated.

The foregoing example, and explanation of the accompanying drawing, illustrates the benefits afforded the manufacture of total xylenes, particularly para-xylene, through the utilization of the method of the present invention.

We claim as our invention:

1. A process for producing para-xylene which comprises subjecting 2-ethylhexene at dehydrocyclization conditions to the action of a catalyst comprising an inorganic refractory oxide carrier material, from about 26% to about 43% by weight of a chromium component and from about 0.01% to about 6% by weight of a potassium component.

2. The process of claim 1 further characterized in that said catalyst contains from about 1% to about 6% by weight of said potassium component.

3. A process for producing para-xylene which comprises subjecting 2-ethylhexene at dehydrocyclization conditions to the action of a catalyst comprising an inorganic refractory oxide carrier material, from about 26% to about 43% by weight of a chromium component, from about 0.01% to about 5% by weight of an alkaline earth metal component and from about 1% to about 6% by weight of a potassium component.

4. The process of claim 3 further characterized in that said refractory oxide carrier material comprises alumina.

5. The process of claim 3 further characterized in that said chromium component comprises chromia.

6. The process of claim 3 further characterized in that the sum of the concentrations of said alkaline earth metal component and said potassium component is within the range of from about 1.01% to about 6% by weight of the total catalyst.

7. A process for producing para-xylene which comprises subjecting 2-ethylhexene at a temperature of from about 400° C. to about 750° C., a total absolute pressure of from about 10 to about 1000 millimeters of mercury and a liquid hourly space velocity of from about 0.01 to about 10, to the action of a catalyst comprising alumina, from about 26% to about 43% by weight of chromia, from about 0.01% to about 5% by weight of an alkaline earth metal component and from about 1% to about 6% by weight of a potassium component.

8. The process of claim 7 further characterized in that said alkaline earth metal component comprises a calcium compound.

9. The process of claim 7 further characterized in that said alkaline earth metal component comprises a magnesium compound.

10. The process of claim 7 further characterized in that said potassium component comprises potassium hydroxide.

11. The process of claim 7 further characterized in that said potassium component comprises potassium oxide.

12. The process of claim 8 further characterized in that said calcium compound comprises calcium oxide.

13. The process of claim 8 further characterized in that said calcium compound comprises calcium hydroxide.

14. The process of claim 9 further characterized in that said magnesium compound comprises magnesium oxide.

15. The process of claim 9 further characterized in that said magnesium compound comprises magnesium hydroxide.

16. The process of claim 9 further characterized in that said magnesium compound comprises magnesium chromate.

References Cited in the file of this patent

UNITED STATES PATENTS

| | | |
|---|---|---|
| 2,317,683 | Greensfelder | Apr. 27, 1943 |
| 2,363,768 | Zetterholm | Nov. 28, 1944 |
| 2,754,345 | Kirshenbaum | July 10, 1956 |